United States Patent [19]

Malaspina

[11] Patent Number: 5,079,674
[45] Date of Patent: Jan. 7, 1992

[54] SUPERCAPACITOR ELECTRODE AND METHOD OF FABRICATION THEREOF

[75] Inventor: Francis P. Malaspina, Fort Pierce, Fla.

[73] Assignee: Motorola, Inc., Schaumburg, Ill.

[21] Appl. No.: 632,850

[22] Filed: Dec. 24, 1990

[51] Int. Cl.$^5$ .......................... H01G 9/00; B01J 17/00
[52] U.S. Cl. .................................. 361/502; 29/25.03; 361/304
[58] Field of Search ............... 361/303, 304, 305, 502; 29/25.03

[56] References Cited

U.S. PATENT DOCUMENTS

| | | | |
|---|---|---|---|
| 3,654,533 | 4/1972 | Porta et al. | 361/304 |
| 4,327,400 | 4/1982 | Muranaka et al. | 361/502 |
| 4,630,176 | 12/1986 | Cuellar et al. | 361/502 |
| 4,737,889 | 4/1988 | Nishino et al. | 361/502 |

FOREIGN PATENT DOCUMENTS 1196683 11/1985 Canada .

Primary Examiner—Donald A. Griffin
Attorney, Agent, or Firm—Daniel K. Nichols

[57] ABSTRACT

An electrode (34) for use in supercapacitors is provided, comprising a sheet of a first active electrode (30) comprising metal oxides, chlorides, bromides, sulfates, nitrates, sulfides, hydrides, nitrides, phsophides, or selenides (22) coated onto porous carbon particles (20). The coated carbon particles are bound together in a matrix (24) of a fluorocarbon resin. The first electrode (30) is laminated to a dielectric separator (32), and a second active electrode (30) similar in composition to the first is laminated to the other side of the dielectric separator (32).

14 Claims, 2 Drawing Sheets

SUPERCAPACITOR ELECTRODE AND METHOD OF FABRICATION THEREOF

TECHNICAL FIELD

This invention relates generally to capacitors and energy storage devices, and more particularly to an electrode for use in supercapacitors.

BACKGROUND

The history of electrochemical energy storage devices, especially capacitors and batteries, has involved attempts to reduce the size, including both weight and volume, and to increase the electrical energy storage capacity while at the same time increasing the voltage required for dielectric breakdown. Recent advances in battery design have included improvements in life, efficiency and energy density by making improved lead-acid, nickel-cadmium, nickel-zinc and various primary cells. However, although many of the devices embracing the recent technological advances have filled a need, there continues to be a requirement for efficient high power density devices which withstand the rigors of continuous use and virtually unlimited cycling in electrical circuits.

The occurrence, under certain conditions, of large electrochemical capacitance, including pseudocapacitance, is well established. Recent technological advances in capacitors have included aluminum electrolytic capacitors, tantalum capacitors, ceramic capacitors and supercapacitors.

The supercapacitor is an electrochemical cell or combination of cells consisting of two electrodes, an electrolyte and a container. The electrodes are composed of one or more oxides of ruthenium, tantalum, rhodium, iridium, cobalt, nickel, molybdenum, tungsten or vanadium deposited on a metal foil. The electrolyte may be acidic, basic or neutral, such as sulfuric acid, potassium hydroxide or sodium sulfate. The supercapacitor is made by laminating electrodes onto a separator. Supercapacitors typically employ stacks of laminated electrodes consisting of a separator between the electrodes. Ion permeable membranes have been used as separators, the particular configuration depending upon the application of the battery. Current-collector grids or meshes are also employed in the electrode assembly, if desired.

A prior art electrode as taught by Craig in Canadian Patent 1,196,683 is made by dipping a sheet of a conductive metal such as titanium into a solution of the metal oxide in order to deposit the metal oxide onto the surface of the metal sheet. The coated metal sheet is then dried, and the dipping and drying process is repeated to build another thin oxide layer. This process is continued until the oxide layer is of a sufficient thickness to function as an electrode. Fabricating a supercapacitor electrode by depositing oxide layers onto a metal substrate as described in the prior art is costly and very lengthy, requiring repeated dipping of the electrode in order to build up an coating of sufficient thickness.

Clearly, the present method of forming an active electrode for supercapacitors is slow and laborious, requiring much time, and is not a method that can be relied upon to achieve high quality, due to the need for repeated dipping of the electrode. A need exists for an improved electrode composition that is easier and faster to fabricate.

SUMMARY OF THE INVENTION

Briefly, according to the invention, there is provided an electrode for use in supercapacitors, comprising a sheet of a first active electrode comprising oxides, chlorides, bromides, sulfates, nitrates, sulfides, hydrides, nitrides, phosphides, or selenides of ruthenium, tantalum, rhodium, iridium, cobalt, nickel, molybdenum, tungsten or vanadium coated onto porous carbon particles. The coated carbon particles are bound together in a matrix of a fluorocarbon resin. The first electrode is laminated to a dielectric separator, and a second active electrode similar in composition to the first is laminated to the other side of the dielectric separator.

In another embodiment, there is provided a method of manufacturing the electrode of the invention, comprising; providing an aqueous solution of metal salts selected from the group consisting of chlorides, bromides, sulfates, nitrates, sulfides, hydrides, nitrides, phosphides, or selenides of ruthenium, tantalum, rhodium, iridium, cobalt, nickel, molybdenum, tungsten or vanadium. Porous carbon particles are added to the solution and mixed to form a slurry, the metal salts adsorbing onto the porous carbon particles. The metal salts are converted to equivalent metal hydroxides or complex oxides, and the solution is decanted. An emulsion of a fluorocarbon polymer is added to the decanted solution and kneaded until the fluorocarbon polymer is fibrilated. The kneaded admixture is formed into a sheet and dried in an oven. The sheet is then laminated to one or both sides of a separator.

DETAILED DESCRIPTION OF THE PREFERRED EMBODIMENT

This invention fabricates a supercapacitor electrode by adsorbing metal oxides onto a high surface area material such as graphite, activated carbon, or a sponge metal matrix such as nickel, titanium or other conductive material.

Figure 1:
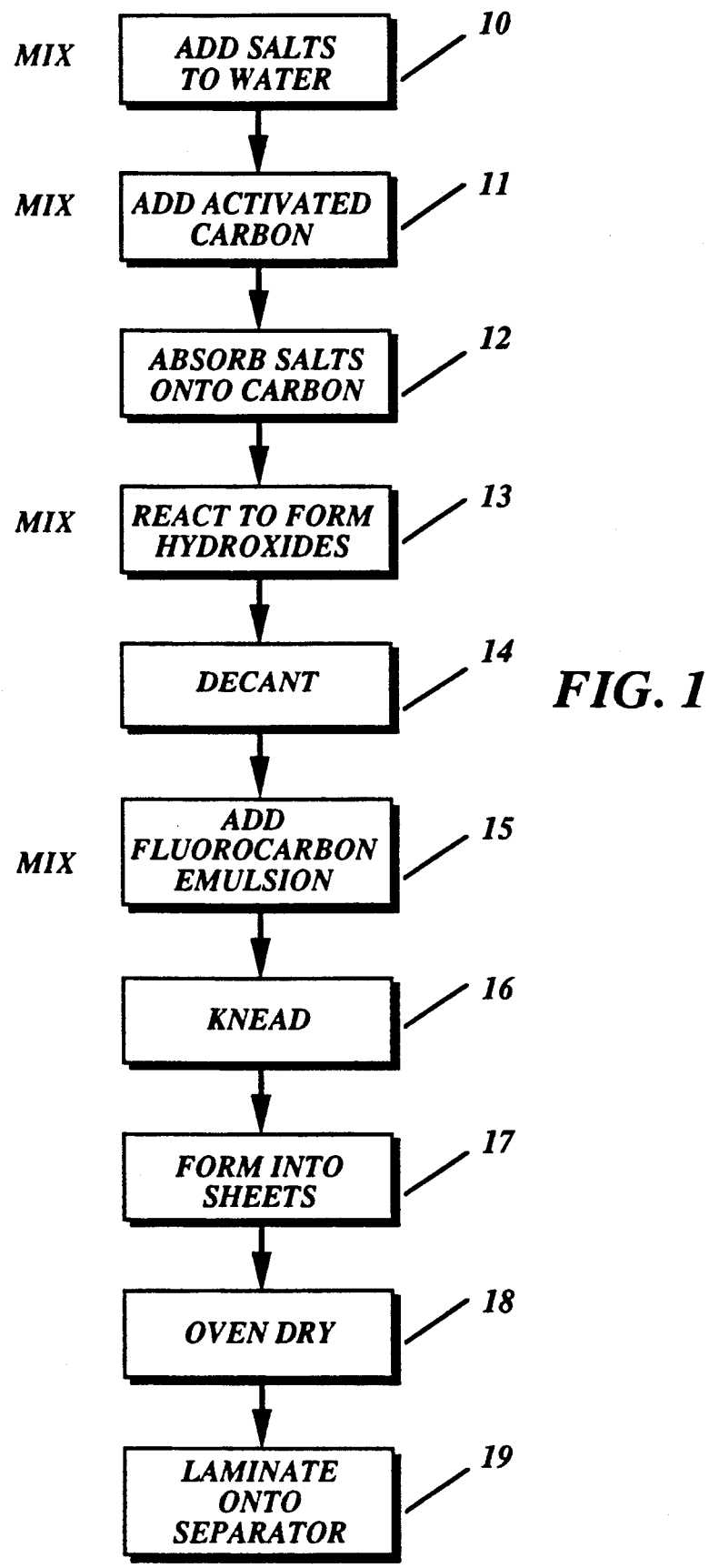
FIG. 1 is a process flow diagram of the method of manufacturing a supercapacitor electrode in accordance with the invention.

Referring to FIG. 1, soluble metal salts are mixed into an aqueous solution 10 in concentrations up to their solubility product. Suitable compounds are materials such as the chlorides, bromides, sulfates, nitrates, sulfides, hydrides, nitrides, phosphides, or selenides of metals such as ruthenium, tantalum, rhodium, iridium, cobalt, nickel, molybdenum, tungsten and vanadium. These metals and others are selected from Groups VB, VIB, VIIB and VIIIB of the Periodic Table. The porous carbon particles (in the form of high surface area activated carbon) or other porous metals are added and mixed into the solution 11 to form a thick slurry having an extremely high surface area. Suitable porous carbon particles are materials such as 100% Compressed Shawinaginan Black #N13F0193 from Sinclair Koppers Inc. of Pittsburgh PA., or Pittsburgh Activated Carbon from Carbon PWA Granular Inc. of Pittsburgh PA. During the mixing, the metal salts are adsorbed onto the surface and absorbed into the pores of the conductive matrix 12. Once this is complete, the salts are chemically converted to the oxides 13 by adding an appropriate amount of potassium or sodium hydroxide in order to react the metal salts to the metal hydroxides. The reaction products are left in solution to serve as the electrolyte for the supercapacitor. The slurry is partially dewatered by a decanting step 14. The residual cake is then transferred to a cokneader 15 where a 1% solution of a fluorocarbon emulsion such as Teflon ® TFE Fluorocarbon Resin Dispersion Product Type 30 (61% solids) from the DuPont Company of Wilmington Del. is added to the mix. Concentrations as low as 0.1% and as high as 5% may also be used, depending on the electrode activity. The resulting slurry is kneaded 16 until the fluorocarbon resin has been totally fibrilated. The resulting dough consisting of coated carbon particles entrapped in a matrix of fluorocarbon resin is now converted into sheet form to comprise an active electrode by extruding or rolling 17 into sheets of suitable thickness. The thickness of the sheets is dependant on the desired final capacitance of the supercapacitor. The sheets are dried 18 by passing through an in-line or batch convection oven at about 110° C. Depending on the type of oven employed, temperatures as low as about 80° C. or as high as about 125° C. may also be employed. The sheets are then laminated 19 onto a suitable separator such as absorbent polypropylene, microporous glass, paper, felt or cellulose. If desired, a second sheet of active electrode is laminated onto the remaining side of the separator. Methods of laminating the active electrodes to the separator are common, and should be obvious to those skilled in the art.

Figure 2:
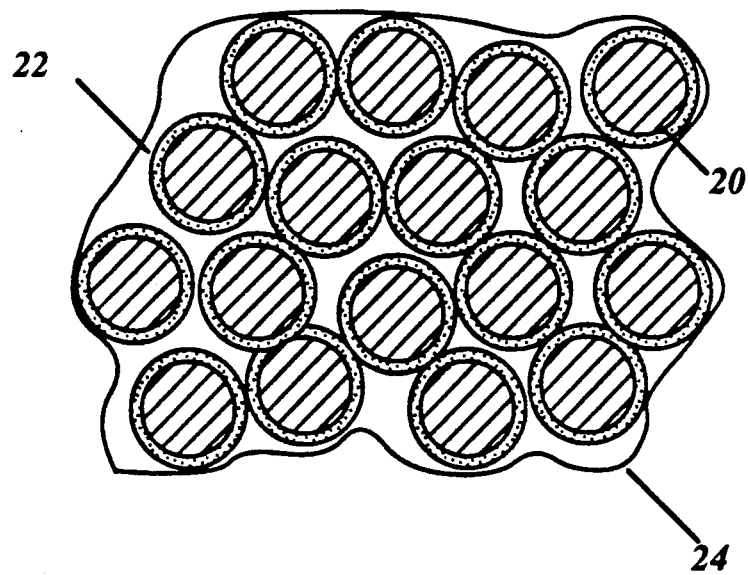
FIG. 2 is a magnified cross-sectional view of an active electrode in accordance with the invention.

In order to better understand the composition of the active electrode sheet, I refer now to a magnified view of a portion of the sheet in FIG. 2. The carbon particles 20 are coated wth metal oxides 22. In practice the coating on the activated carbon particles is very thin, and penetrates a distance into the pores of the activated carbon 20. After the fluorocarbon resin emulsion is fibrilated into the slurry and formed into a sheet, the fluorocarbon resin 24 surrounds the coated carbon particles to entrap and bind them to form a solid sheet.

Figure 3:
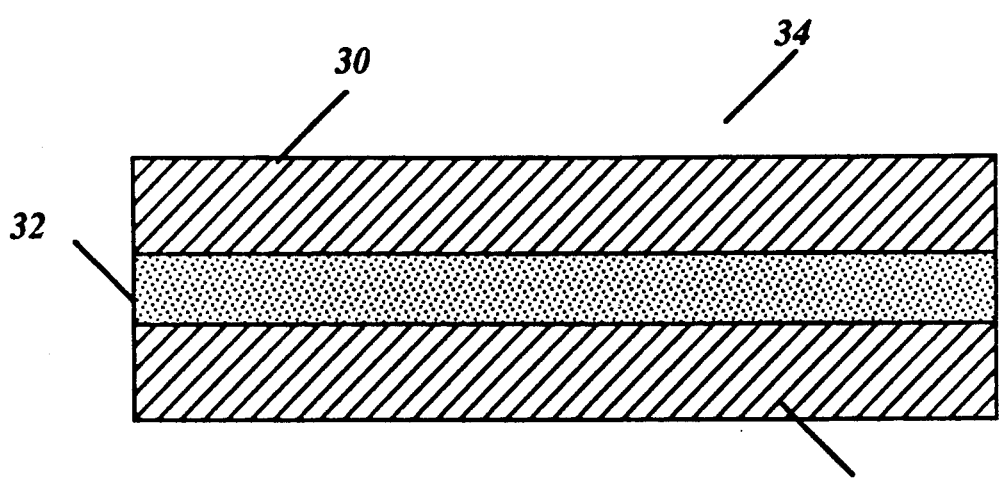
FIG. 3 is a cross-sectional view of a laminated electrode in accordance with the invention.

Referring now to FIG. 3, the sheet of active electrode is laminated to the separator 32. If desired, an additional sheet of active electrode 30 can be laminated to the opposite side of the separator 32 to form a sandwich. The laminated sheets of electrodes are then cut into the desired size and assembled to form a supercapacitor by creating a stack comprising a laminated electrode 34, an additional separator (not shown), another laminated electrode 34, another separator (not shown), another laminated electrode 34, and so on, until the desired capacitance is achieved. The stack is then suitably connected to leads or terminals and placed into a suitable container. The supercapacitor is then activated by adding a liquid electrolyte, such as water, dilute acids (sulfuric or sulfamic acid), or dilute bases (potassium hydroxide or sodium hydroxide). The concentrations of the acids or bases may range from about 0.1 molar to about 5 molar. A cover is then sealed on the container to complete the supercapacitor. It can be seen that fabricating an electrode as described in the invention results in an electrode that can be made in large quantities, and in a continuous process if desired. The elimination of the stepwise method used in the prior art results in an electrode that is more uniform and has the ability to be more efficient.

Variations in the construction of the supercapacitor electrode and capacitor as described herein, while not described in detail, will be obvious to those with ordinary skill in the art, and should not be construed as being beyond the scope of the invention.

What is claimed is:

1. An electrode for use in supercapacitors, comprising a laminate of:
    a dielectric separator; and
    first and second active electrodes comprising metal oxides, chlorides, bromides, sulfates, nitrates, sulfides, hydrides, nitrides, phosphides, or selenides coated onto porous carbon particles, the coated carbon particles being bound together in a matrix of fluorocarbon resin; the first and second active electrodes being bonded to opposite sides of the dielectric separator.

2. The electrode of claim 1, wherein the metal oxide, sulfide, hydride, nitride, phosphide, or selenide is selected from the group consisting of compounds of ruthenium, tantalum, rhodium, iridium, cobalt, nickel, molybdenum, tungsten and vanadium.

3. The electrode of claim 1, wherein the separator is plastic, microporous glass, paper, felt or cellulose.

4. The electrode of claim 1, wherein the porous carbon particles comprise activated carbon.

5. The electrode of claim 1, wherein the fluorocarbon resin is polytetrafluoroethylene.

6. The electrode of claim 1, wherein the metal oxides, chlorides, bromides, sulfates, nitrates, sulfides, hydrides, nitrides, phosphides, or selenides are selected from the group consisting of oxides, sulfides, hydrides, nitrides, phosphides, or selenides of ruthenium, tantalum, rhodium, iridium, cobalt, nickel. molybdenum, tungsten and vanadium.

7. A supercapacitor electrode, comprising:
    first and second active electrodes comprising metal oxides, chlorides, bromides, sulfates, nitrates, sulfides, hydrides, nitrides, phosphides, or selenides coated onto activated carbon particles, the coated carbon particles being bound together in a tetrafluoroethylene resin matrix and formed into a sheet; and
    a plastic separator having first and second sides; the first active electrode being adjacent to the first side of the plastic separator, and the second active electrode being adjacent to the second side of the plastic separator.

8. A method of manufacturing a supercapacitor electrode, comprising the step of:
    a) providing a separator;
    b) providing an aqueous solution of metal salts selected from the group consisting of chlorides, bromides, sulfates, nitrates, sulfides, hydrides, nitrides, phosphides, or selenides of ruthenium, tantalum, rhodium, iridium, cobalt, nickel, molybdenum, tungsten or vanadium;
    c) adding porous carbon particles to the solution and mixing to form a slurry, the metal salts adsorbing onto the porous carbon particles;
    d) converting the metal salts to equivalent metal hydroxides;
    e) decanting the solution;
    f) adding an emulsion of a flurocarbon polymer to the decanted solution;
    g) kneading the admixture of fluorocarbon polymer and decanted solution until the fluorocarbon polymer is fibrilated;
    h) forming the kneaded admixture into a sheet;
    i) drying the kneaded admixture; and j) laminating the sheet to the separator.

9. The method of claim 8, comprising a further step of laminating a second of the rolled kneaded admixture to the separator to form a structure having the separator laminated between the sheets.

10. The method of claim 8, wherein the amount of fluorocarbon polymer is greater than about 0.1 weight percent and less than about 5 weight percent.

11. The method of claim 8, wherein the step of drying the admixture comprises drying in an oven between about 95° C. and about 125° C.

12. The method of claim 8, wherein the step of converting the metal salts comprises reacting the metal salts with an alkali hydroxide.

13. The method of claim 8, wherein the step of forming a sheet comprises extruding or rolling the kneaded admixture.

14. An electrical energy storage device, comprising at least two electrodes, an electrolyte, and a container therefor, wherein at least one electrode comprises:
   a dielectric separator; and
   first and second active electrodes comprising oxides, chlorides, bromides, sulfates, nitrates, sulfides, hydrides, nitrides, phosphides, or selenides of ruthenium, tantalum, rhodium, iridium, cobalt, nickel molybdenum, tungsten or vanadium coated onto porous carbon particles, the coated carbon particles being bound together in a matrix of fluorocarbon resin, the first and second active electrodes being bonded to opposite sides of the dielectric separator.

* * * * *

UNITED STATES PATENT AND TRADEMARK OFFICE
CERTIFICATE OF CORRECTION

PATENT NO. : 5,079,674
DATED : January 7, 1992
INVENTOR(S) : Francis P. Malaspina It is certified that error appears in the above-identified patent and that said Letters Patent is hereby corrected as shown below:

Title page, column 2, line 4, in the Abstract delete "phsophides" and insert therefor --phosphides--.

Column 5, Claim 9, line 4, between "second" and "of the rolled" insert --sheet --.

Signed and Sealed this

Twentieth Day of April, 1993

Attest:

MICHAEL K. KIRK

Attesting Officer

Acting Commissioner of Patents and Trademarks